United States Patent [19]

Jönsson et al.

[11] 4,454,160
[45] Jun. 12, 1984

[54] AROMA DISTILLATE AND METHOD FOR PREPARING SAME

[75] Inventors: Hans Jönsson, Lund; Hans-Erik Pettersson, Löddeköping; Kennerth Andersson, Södra Sandby, all of Sweden

[73] Assignee: Svenska Mejeriernas Riksforenings Ekonomi AB, Stockholm, Sweden

[21] Appl. No.: 405,128

[22] Filed: Aug. 4, 1982

Related U.S. Application Data

[63] Continuation of Ser. No. 158,560, Jun. 11, 1980, abandoned.

[30] Foreign Application Priority Data

Jun. 15, 1979 [SE] Sweden .............................. 7905271

[51] Int. Cl.$^3$ .................. A23C 9/12; A23C 21/02; A23L 1/23; C12P 7/26
[52] U.S. Cl. ................................ 426/34; 426/41; 426/43; 426/534; 426/655; 426/650; 426/387; 426/492; 435/148; 435/885
[58] Field of Search .............. 435/136, 148, 170, 885; 426/34, 41, 42, 43, 386, 387, 492, 534, 650, 655, 613

[56] References Cited

U.S. PATENT DOCUMENTS

| | | | |
|---|---|---|---|
| 2,196,239 | 4/1940 | Werkman et al. | 426/34 |
| 2,586,072 | 2/1952 | Marcoux | 426/43 |
| 2,928,746 | 3/1960 | Donahue et al. | 426/534 |
| 3,048,490 | 8/1962 | Lundstedt | 426/41 |
| 3,962,464 | 6/1976 | Sozzi | 426/43 |

FOREIGN PATENT DOCUMENTS

| | | | |
|---|---|---|---|
| 7413090 | 4/1976 | Netherlands | 426/43 |
| 337025 | 10/1930 | United Kingdom | 435/148 |

*Primary Examiner*—Esther M. Kepplinger
*Attorney, Agent, or Firm*—Karl W. Flocks; Sheridan Neimark

[57] ABSTRACT

An aroma distillate of a bacterial culture containing α-acetolactic acid is prepared by acidifying the bacterial culture to a pH of about 3–4 and subjecting it to water vapor distillation in the presence of oxygen for oxidation of the α-acetolactic acid to diacetyl. When 10% of the culture is driven off, a yield of 85% of diacetyl is obtained. The resultant distillate is used for aromatizing edible fats.

6 Claims, 1 Drawing Figure

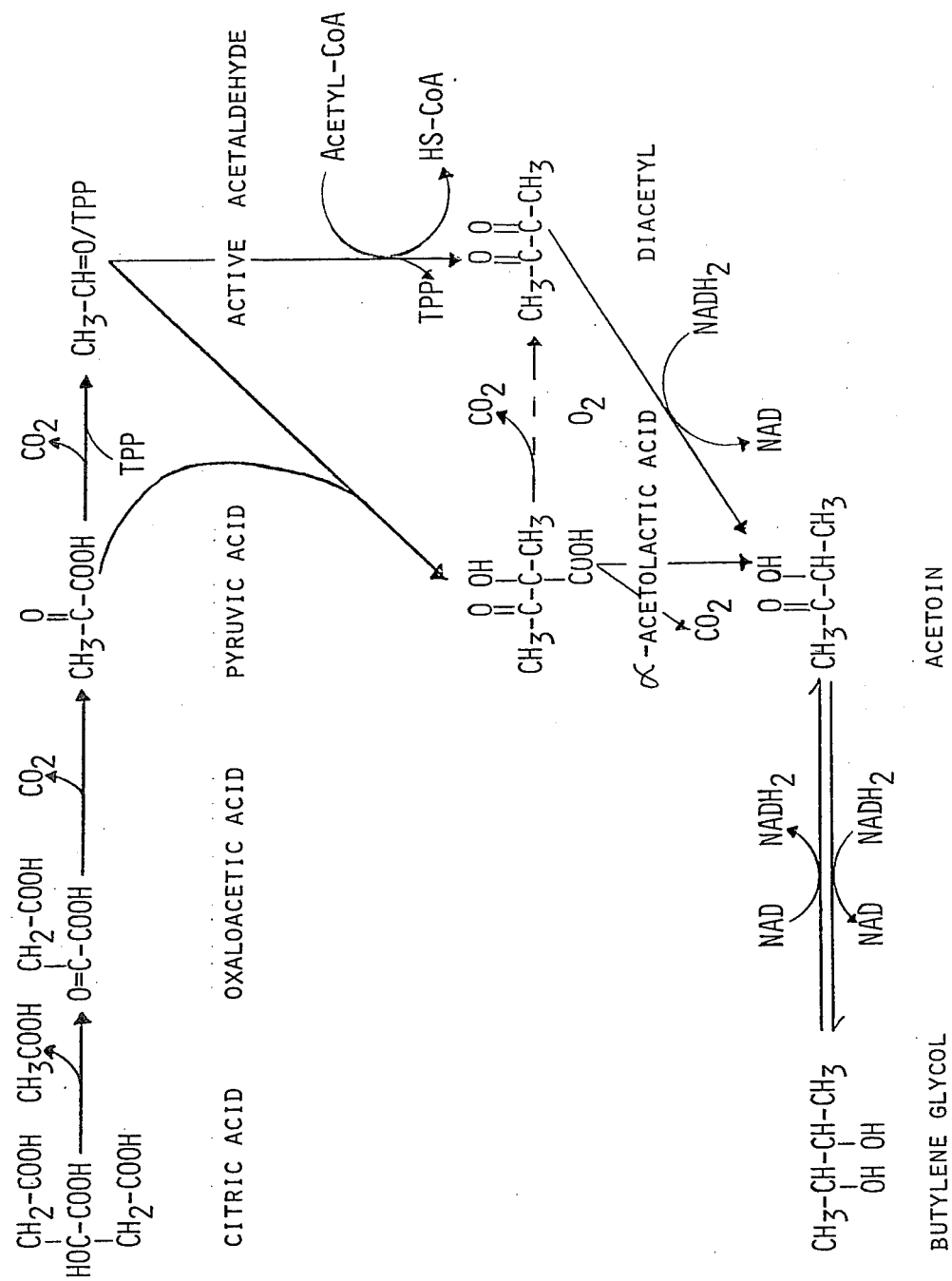

AROMA DISTILLATE AND METHOD FOR PREPARING SAME

This is a continuation of application Ser. No. 158,560 filed June 11, 1980, now abandoned.

The present invention relates to an aroma distillate of a bacterial culture containing $\alpha$-acetolactic acid for aromatizing edible fats and to a method for the preparation of the distillate.

To define butter aroma or flavour analytically or chemically is difficult. It has, however, been long known that diacetyl is an important flavour component in the particular butter taste. Other important flavours are acetaldehyde, dimethyl sulphide, acetic acid and certain lactones. Another factor which affects the aroma is the pH of the edible fat.

In the manufacture of Swedish type butter use is made of a particular salting method, raising the pH value of the butter to 6.7. The object of this pH adjustment is to improve the oxidation stability of the butter. The storing stability of the butter is dependent upon the pH value and the degree of salting of the butter, soured and salted butter having the poorest oxidation stability and unsoured and unsalted butter the best. Thus, unsoured and unsalted butter can be stored about 4 times as long at 5° C. as can the corresponding soured and salted butter.

The pH adjustment brings about a neutralization of the lactic acid produced during the bacteriological souring of cream and whose acid flavour thus cannot be used. In the manufacture of Swedish type butter, therefore, the major task of the souring or starter culture is to produce the particular butter aroma, i.e. that produced primarily by diacetyl.

It has therefore been suggested in the manufacture of edible fats to replace souring by starter culture by other kinds of aromatization. Several advantages would then be such as a resulting sweet buttermilk, greater freedom when optimizing the temperature treatment of the cream before churning and a more consistent product quality, in particular as regards odour and flavour.

It is not advisable to add pure, synthetically prepared diacetyl, giving a harsh undesired taste of diacetyl. In order to have a properly balanced butter flavour, the other important aroma substances, such as acetic acid, dimethyl sulphide, acetaldehyde and certain lactones, must be incorporated.

Attempts have been made with a special souring method involving the addition of a lactic acid concentrate and two different starter cultures directly to the butter granules in the churn. Giving a satisfactory butter quality, this method is, however, complicated, for instance in that two special cultures have to be grown, thus making the method expensive and less attractive.

Another alternative is to add synthetically prepared aroma liquids. With this method, however, it is difficult to obtain a satisfactory product quality and the method is not attractive from the point of view of marketing, since such an addition must be openly specified according to the new Swedish Food Act.

A more advantageous way of achieving the desired butter flavour in edible fat is, instead of synthetic aroma liquids, to add a culture distillate to the edible fat, since such a distillate is a natural dairy product.

The culture distillates hitherto used are prepared in that prior to distillation, $FeCl_3$ is added to the fully grown culture for oxidation of acetoin to diacetyl. If this step were not performed, the diacetyl content would be too low in the distillate. Normally, the acetoin content is from 50 to 100 times higher than that of diacetyl.

By the present invention, there is provided a method of preparing an aroma distillate of a bacterial culture containing $\alpha$-acetolactic acid for aromatizing edible fats, characterized by acidifying the bacterial culture which is then water vapour distilled in the presence of oxygen for oxidation of $\alpha$-acetolactic acid to diacetyl. It is particularly preferred that the bacterial culture is acidified to a pH of from 3 to 4. Driving off about 5-15%, e.g. 10% of the culture in the distillation is economical.

The present invention also relates to an aroma distillate for aromatizing edible fats, characterized in that it is derived from an acidified bacterial culture which contains $\alpha$-acetolactic acid and has been subjected to water vapour distillation in the presence of oxygen for oxidation of the $\alpha$-acetolactic acid to diacetyl.

$\alpha$-acetolactic acid is a chemically unstable intermediary reaction product in the citric acid metabolism, see FIGURE. Some cultures accumulate high contents of this compound. In other cultures, the $\alpha$-acetolactic acid is immediately metabolized, i.e. no substantial accumulation occurs.

In the method according to the present invention, use has been made of a Dutch starter culture composed of Streptococcus diacetylactis and *Streptococcus lactis/cremoris* (D culture). This culture has been grown on different media, such as whey with the addition of yeast extract and skim milk of different total solids (TS) with or without the addition of citric acid.

The bacterial culture used has a remarkably substantial accumulation of $\alpha$-acetolactic acid, up to a content of 650 mg/kg in an ordinary skim milk substrate of a TS content of 9.1%.

The $\alpha$-acetolactic acid in a bacterial culture can be converted to diacetyl by air oxidation in conjunction with water vapour distillation thereof. The oxidation yield then is dependent upon the pH value of the medium, a pH of from 3 to 4, particularly about 3.5, being favourable for obtaining a high yield. Thus, if the pH value is adjusted to about 3.5 before the distillation in oxygen atmosphere, an oxidation yield of about 70% is had.

When about 10% of the initial culture volume have been driven off in the form of a distillate, about 85% of the available amount of diacetyl has been carried over.

In order to obtain oxidizing conditions during distillation, the water vapour is mixed with oxygen or air before it is supplied to the culture.

For acidification of the culture prior to distillation to a pH of about 3.5, any suitable acid may be used. In experiments, use has been made of int.al. hydrochloric acid (2N) and lactic acid (18%) without any difference in the quality of the distillate.

One way of increasing the yield of $\alpha$-acetolactic acid during fermentation and thus raising the diacetyl content in the distillate is to increase the citric acid content in the substrate. This may be achieved either by increasing the total solids of the substrate where the citric acid is a natural component, or by adding pure citric acid to the substrate. However, this effect decreases at high contents of citric acid. One reason for this probably is that an addition of citric acid above a certain content results in that the excess is metabolized to acetic acid and not to $\alpha$-acetolactic acid. Below is given a Table listing different substrates with or without the addition of citric acid and showing the obtained diacetyl and acetic acid contents in the distillates when 10% by volume are driven off.

TABLE 1

| Substrate | | Diacetyl content (mg/kg) | Acetic acid content (mg/kg) |
|---|---|---|---|
| Skim milk | 16% TS | 2124 | 594 |
| Skim milk | 9% TS | 1369 | 610 |
| Skim milk | 9% TS + 1.5 g/l citric acid | 2369 | 612 |
| Skim milk | 9% TS + 3 g/l citric acid | 2666 | 848 |
| Whey | 12% TS | 2286 | 559 |

By aromatizing edible fats by the addition of the culture distillate as prepared according to the present invention, production costs can be considerably reduced. In addition, sweet buttermilk is obtained.

Moreover, there is no need to add special salt, the problems associated with high-viscosity cream in the butter making machine may be eliminated and the temperature treatment of the cream can be performed more efficiently. Further, the typical butter flavour can also readily be obtained for other edible fats.

The invention will be understood more easily with reference to the Example given below which is meant in no way to restrict the scope of the invention as it will appear from the appended claims.

EXAMPLE

A bacterial culture was prepared by growing the special culture composed of S diacetylactis and S lactis/cremoris on a substrate of whey of a TS content of 12%. The pH value in the culture obtained was adjusted to 3.5.

The acidified bacterial culture was subjected to water vapour distillation, the water vapour supplied being mixed with oxygen in an amount of about 4 l of pure oxygen per minute at a distillation volume of 2 l. The vapour supply was so controlled that about 10% of the volume of the culture was driven off in the form of distillate in about 20 minutes. Under these conditions, about 85% of the available amount of diacetyl was carried over.

The prepared distillate was then used for aromatizing butter on a pilot scale. Two tests were performed, one with an addition of 0.07% distillate (B) and the other with an addition of 0.14% distillate (C). The distillates contained about 2,000 mg of diacetyl/kg. For comparison, butter was also manufactured by direct granule souring and aromatization according to the above-defined Dutch method (A). The butter samples were kept at different temperatures, viz. $-20°$ C., $+6°$ C. and $+14°$ C., for varying periods of time. The fresh butter samples were analyzed with respect to pH and diacetyl content. The results appear from Table 2.

TABLE 2

| Butter sample | Diacetyl content (mg/kg) | pH |
|---|---|---|
| A (reference sample) | 0.50 | 6.9 |
| B | 0.65 | 6.7 |
| C | 1.46 | 6.7 |

The butter samples were kept at different temperatures, viz. $-20°$ C., $+6°$ C. and $+14°$ C. In Table 3, the judgements as to odour and flavour have been compiled together with analytic results as to diacetyl content, peroxide number and content of free fatty acids of the butter samples.

It will be appreciated from the odour and flavour judgement that butter admixed with 0.07% distillate (sample B) is of the same quality as the butter manufactured according to the Dutch direct granule souring method. The butter samples displayed satisfactory oxidation stability, which is evident from the peroxide numbers measured, even after storing conditions as extreme as 50 days at $+14°$ C. Neither could an increased lipolysis level be noted during the period of storing. The microbiological analyses of the samples indicated a satisfactory quality for all the samples.

TABLE 3

RESULTS OF TASTE JUDGEMENT AND CHEMICAL ANALYSES

| Butter sample | Storing conditions | | | | | | |
|---|---|---|---|---|---|---|---|
| | $-20°$ C. | $+6°$ C. | | | $+14°$ C. | | |
| | 14 days at $+14°$ C. | 28 days | 2 months | 3 months | 14 days | 28 days | 56 days |
| A Odour and taste judgement (5 degree scale) | | | | | | | |
| A (ref.) | 4.0 | 3.8 | 3.8 | 4.2 | 4.6 | 4.0 | 3.8 |
| B 0.07% dist. | 4.2 | 4.0 | 4.2 | 3.8 | 4.4 | 3.8 | 3.8 |
| C 0.14% dist. | 4.0 | 3.8 | 4.0 | 3.8 | 4.0 | 3.6 | 3.6 |
| B Diacetyl content mg/kg | | | | | | | |
| A | 0.74 | — | — | 0.80 | 0.74 | 1.3 | — |
| B | 0.68 | — | — | 0.53 | 0.68 | 1.0 | — |
| C | 1.3 | — | — | 1.2 | 1.3 | 1.6 | — |
| C Peroxide number mg/kg | | | | | | | |
| A | 0.03 | 0.03 | 0.04 | 0.03 | 0.03 | 0.03 | 0.08 |
| B | 0.03 | 0.03 | 0.05 | 0.03 | 0.03 | 0.03 | 0.04 |
| C | 0.03 | 0.03 | 0.05 | 0.03 | 0.03 | 0.03 | 0.04 |
| D Acid number milliequ./100 g fat | | | | | | | |
| A | 0.76 | 0.75 | 0.86 | 0.88 | 0.74 | 0.78 | 0.93 |
| B | 0.76 | 0.77 | 0.81 | 0.80 | 0.68 | 0.78 | 0.85 |
| C | 0.73 | 0.78 | 0.78 | 0.81 | 0.75 | 0.77 | 0.81 |

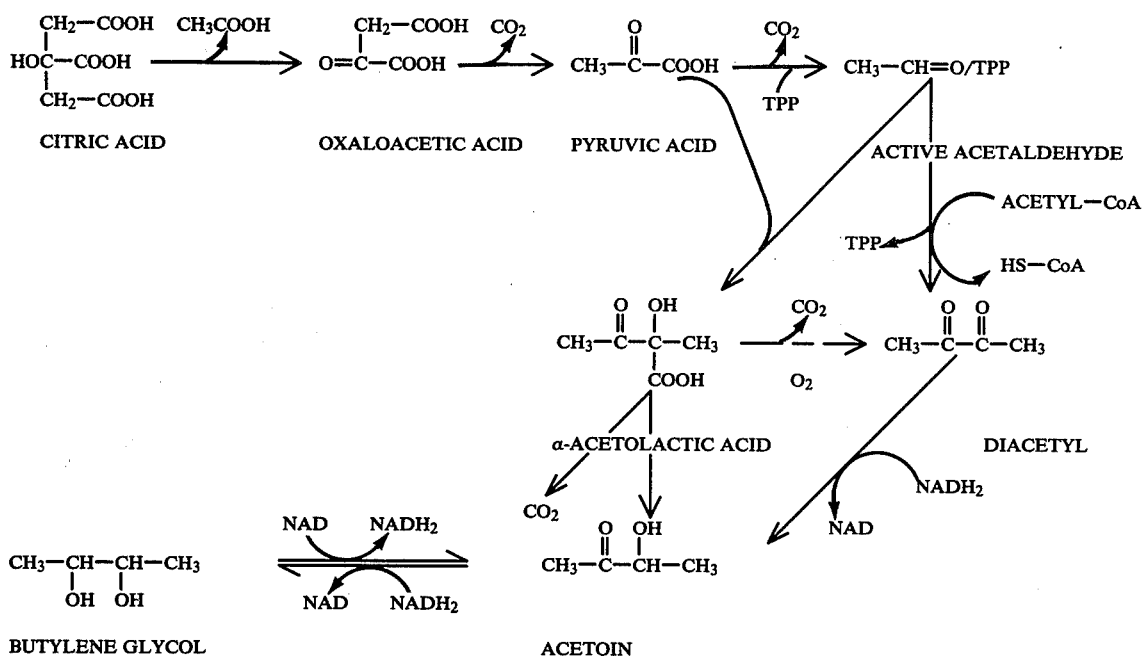

What we claim and desire to secure by Letters Patent is:

1. A method of preparing a natural butter aroma distillate from a bacterial culture containing α-acetolactic acid, comprising
providing a bacterial culture medium comprising skim milk or whey as substrate, the bacteria being composed of a mixture of *Streptococcus diacetylactis*, *Streptococcus lactis* and *Streptococcus cremoris* and the medium having a substantial accumulation of α-acetolactic acid;
acidifying the bacterial culture medium to a pH of from 3 to 4; and
effecting water vapour distillation of said acidified bacterial culture medium, in the presence of oxygen, to convert the α-acetolactic acid to diacetyl and to distill off approximately 5–15% of the bacterial culture medium.

2. A method according to claim 1 wherein said acidifying is effected to a pH of about 3.5, and said water vapour distillation involves driving off about 10% of the bacterial culture medium, whereby an oxidation yield of about 70% is provided and about 85% of the available amount of diacetyl is distilled.

3. A method according to claim 2 wherein the resultant distillate has a diacetyl content ranging from approximately 1369–2666 mg/kg.

4. A method according to claim 1 further comprising, as a preliminary step, growing the bacterial culture in a medium of increased citric acid content.

5. A method according to claim 1 wherein said bacterial culture medium comprises skim milk as substrate having a total solid content prior to cultivation of at least about 9%.

6. A method according to claim 1 wherein said bacterial culture medium comprises skim milk having a total solids contents prior to cultivation of at least about 9%, or whey as substrate having a total solids content prior to cultivation of about 12%.

* * * * *